(12) United States Patent
Sherlock et al.

(10) Patent No.: US 10,489,298 B2
(45) Date of Patent: Nov. 26, 2019

(54) HARDWARE FLUSH ASSIST

(71) Applicant: HEWLETT PACKARD ENTERPRISE DEVELOPMENT LP, Houston, TX (US)

(72) Inventors: Derek Alan Sherlock, Boulder, CO (US); Shawn Walker, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/747,755

(22) PCT Filed: Jul. 28, 2015

(86) PCT No.: PCT/US2015/042500
§ 371 (c)(1),
(2) Date: Jan. 25, 2018

(87) PCT Pub. No.: WO2017/019042
PCT Pub. Date: Feb. 2, 2017

(65) Prior Publication Data
US 2018/0217933 A1 Aug. 2, 2018

(51) Int. Cl.
| | | |
|---|---|---|
| *G06F 12/00* | (2006.01) | |
| *G06F 12/0862* | (2016.01) | |
| *G06F 9/30* | (2018.01) | |
| *G06F 12/0804* | (2016.01) | |
| *G06F 12/0817* | (2016.01) | |
| *G06F 12/0873* | (2016.01) | |
| *G06F 12/0891* | (2016.01) | |

(52) U.S. Cl.
CPC ........ *G06F 12/0862* (2013.01); *G06F 9/3004* (2013.01); *G06F 12/0804* (2013.01); *G06F 12/0817* (2013.01); *G06F 12/0873* (2013.01); *G06F 12/0891* (2013.01)

(58) Field of Classification Search
None
See application file for complete search history.

(56) References Cited

U.S. PATENT DOCUMENTS

| | | | |
|---|---|---|---|
| 6,405,291 B1 | 6/2002 | Ghosh et al. | |
| 6,408,363 B1 * | 6/2002 | Lesartre | G06F 9/3834 711/135 |
| 6,643,766 B1 | 11/2003 | Lesartre et al. | |

(Continued)

FOREIGN PATENT DOCUMENTS

EP     1555611 A2     7/2005

OTHER PUBLICATIONS

Manu Awasthi, "Dynamic Hardware-assisted Software-controlled Page Placement to Manage Capacity Allocation and Sharing within Large Cache," high-perfomance computer architecture 2009, 12 pages, www.cs.utah.edu/~rajeev/pubs/hpca09a.pdf.

(Continued)

*Primary Examiner* — Daniel D Tsui
(74) *Attorney, Agent, or Firm* — Hewlett Packard Enterprise Patent Department

(57) ABSTRACT

An apparatus for assisting a flush of a cache is described herein. The apparatus comprises processing element. The processing element is to probe a cache line at an offset address and write the cache line at the offset address to a non-volatile memory in response to a flush instruction at a first address.

12 Claims, 4 Drawing Sheets

(56) References Cited

U.S. PATENT DOCUMENTS

| | | |
|---|---|---|
| 7,139,876 B2 | 11/2006 | Hooker |
| 2002/0087799 A1 | 7/2002 | Faraboschio et al. |
| 2004/0158681 A1 | 8/2004 | Hooker |
| 2010/0235670 A1 | 9/2010 | Keller et al. |
| 2013/0024623 A1* | 1/2013 | Reid ................... G06F 12/0804 711/135 |
| 2014/0108730 A1* | 4/2014 | Avudaiyappan .... G06F 12/0891 711/122 |
| 2014/0365736 A1 | 12/2014 | Simionescu et al. |

OTHER PUBLICATIONS

PCT/ISA/KR, International Search Report and Written Opinion, dated Apr. 25, 2016, PCT/US2015/042500 12 pages.

* cited by examiner

100

200A

HARDWARE FLUSH ASSIST

BACKGROUND

The advent of cloud computing and handheld devices has increased the demand for faster and more reliable access to data. Database performance relies heavily on the average access time of storage by a processor. Systems heretofore utilize various techniques to enhance the performance of data transfers between processors and storage.

BRIEF DESCRIPTION OF THE DRAWINGS

The advantages of the present examples are better understood by referring to the following detailed description and the attached drawings, in which.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Figure 1:
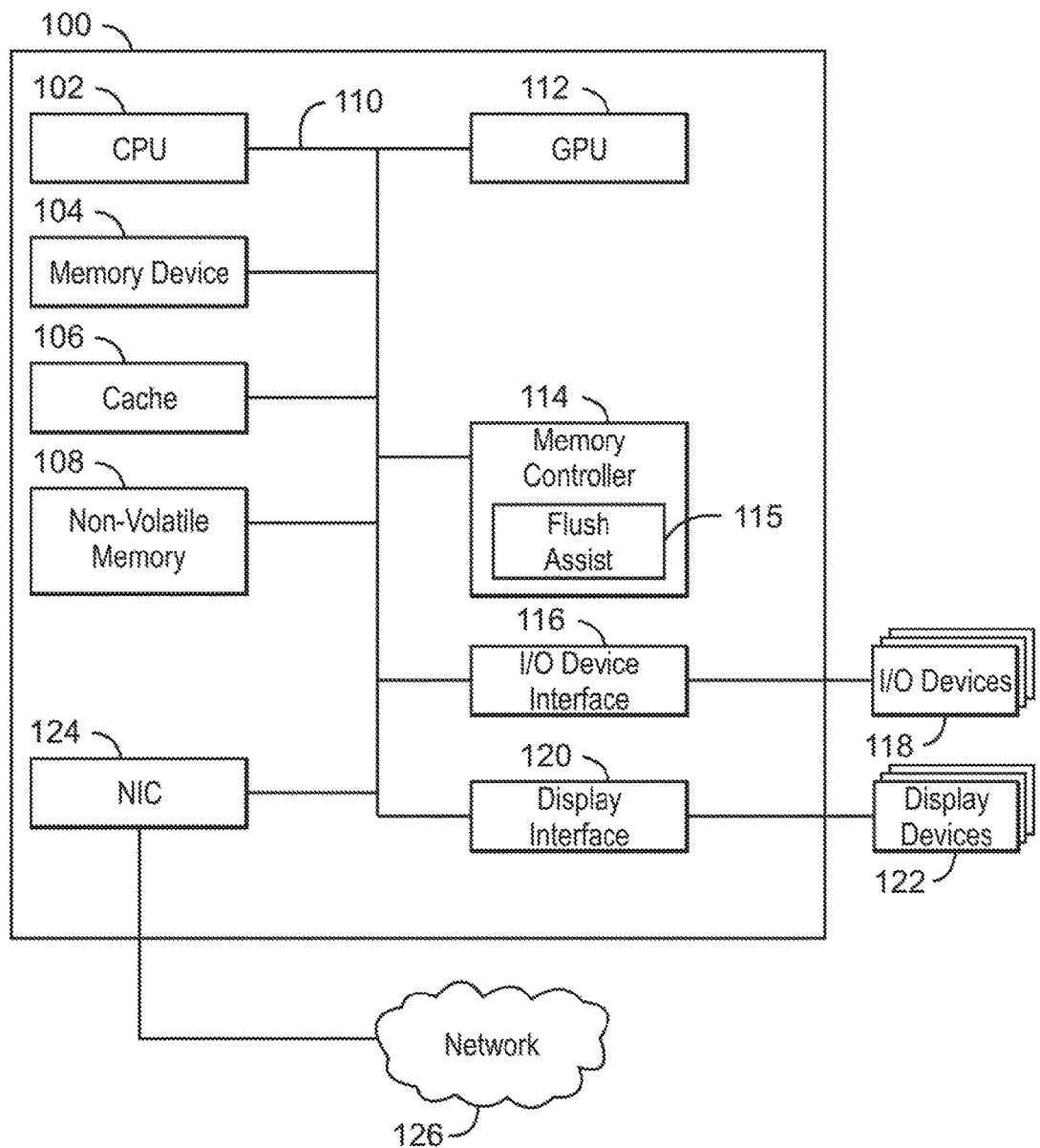
FIG. 1 is a block diagram of a computing device that may be used to assist a flush of a cache.

Most central processing unit (CPU) architectures enable cache management instructions which explicitly flush modified regions of the cache to memory under programmatic control. The region of the cache may be a cache line. Additionally, this type of instruction is often termed a flush operation when the cache line is also invalidated, or a clean operation when the cache line remains valid. As used herein, a flush, flush operation, or flush instruction is the transfer of data from a cache to another level of memory. In some embodiments, the flush operation is performed from the cache to a non-volatile memory. For ease of description, the present techniques are described using a flush, flush operation, or flush instruction. However, the present techniques can be applied to any instruction where data is transferred from a first regions to another location.

Synchronization barrier instructions enable notifications to software when all previously-issued flush operations have completed. These barrier instructions prevent race condition hazards that might otherwise occur if, for example, a stored data record were marked as being valid before the content of the record was in fact valid. By flushing the record contents and then using a synchronization barrier to ascertain that the flush was complete, the software can delay marking the record as valid until its content is known to already be written to persistent memory.

In CPU architectures that include a blocking direct memory access (DMA) model for non-volatile memory access and a load-store model for volatile memory access, the instructions for flushing and for synchronization barriers are intended for relatively low-volume tasks, such as synchronizing data structures shared between caches lacking hardware coherency. For example, the flushing and synchronization barriers are used to synchronize data and instruction caches in self-modifying code, or to synchronize page table updates with translation caches. As a result, the flush instructions and synchronization barriers may not be well-suited to high volume use. For example, these instructions may lead to poor system performance when applied to high volume usage models. This poor system performance is a result of small tracker sizes, lack of pipelining and concurrency optimization, etc.

Applying a load-store model to non-volatile memory places demands upon these instructions that can result in high volume use. For example, a database designed to operate directly within non-volatile memory may end up doing most or all of its writes as part of commit sequences, which depend upon flush instructions rather than cache evictions to write the modifications into non-volatile memory. To maintain acceptable system performance when flush operations are applied to a non-volatile memory under a load-store model, hardware may be used to assist the flushing of a cache to non-volatile memory. Embodiments described herein include a memory controller architecture that assists with the process of flushing targeted regions of a cache to overcome performance limitations of the CPU's instruction-driven flush sequences. In some embodiments, based on an initial flush instruction, the cache is then flushed at an address that is offset from the address of the initial flush instruction.

FIG. 1 is a block diagram of a computing device 100 that may be used to assist a flush of a cache. The computing device 100 may be, for example, a laptop computer, desktop computer, ultrabook, tablet computer, mobile device, or server, among others. The computing device 100 may include a central processing unit (CPU) 102 that is configured to execute stored instructions, as well as a memory device 104 that stores instructions that are executable by the CPU 102. The computing device 100 may also include a cache 106 and non-volatile memory 108. The CPU may be coupled to the memory device 104, cache 106, and non-volatile memory 108 by a bus 110. Additionally, the CPU 102 can be a single core processor, a multi-core processor, a computing cluster, or any number of other configurations. Furthermore, the computing device 100 may include more than one CPU 102.

The memory device 104 can include random access memory (RAM), read only memory (ROM), flash memory, or any other suitable memory systems. For example, the memory device 104 may include dynamic random access memory (DRAM). The cache 106 may be a smaller, faster memory that stores a smaller subset of frequently used data for the CPU 102. In some embodiments, the cache 106 is a multi-level cache. Additionally, the cache 106 may be integrated with the memory device 104. A larger data set may be stored in a non-volatile memory 108. The non-volatile memory 108 may be a physical memory such as a hard drive, an optical drive, a thumbdrive, an array of drives, or any combinations thereof. The non-volatile memory 108 may also include remote storage drives. The amount of time for the CPU 102 to access data stored in the non-volatile memory 108 may be slower relative to the amount of time it takes for the CPU 102 to access the cache 106.

The computing device 100 may also include a graphics processing unit (GPU) 112. As shown, the CPU 102 may be coupled through the bus 110 to the GPU 112. The GPU 112 may be configured to perform any number of graphics operations within the computing device 100. For example, the GPU 112 may be configured to render or manipulate graphics images, graphics frames, videos, or the like, to be displayed to a user of the computing device 100. The computing device 100 may also include a memory controller 114. In some embodiments, the memory controller is a home agent for the non-volatile memory 108. As used herein, a home agent is an entity that controls access to the non-volatile memory 108. The home agent can keep track of the status of data stored at the non-volatile memory 108.

The CPU 102 may also be connected through the bus 110 to an input/output (I/O) device interface 116 configured to connect the computing device 100 to one or more I/O devices 118. The I/O devices 118 may include, for example, a keyboard and a pointing device, wherein the pointing device may include a touchpad or a touchscreen, among others. The I/O devices 118 may be built-in components of the computing device 100, or may be devices that are externally connected to the computing device 100.

The CPU 102 may be linked through the bus 110 to a display interface 120 configured to connect the computing device 100 to display devices 122. The display devices 122 may include a display screen that is a built-in component of the computing device 100. The display devices 122 may also include a computer monitor, television, or projector, among others, that is externally connected to the computing device 100. The computing device 100 may also include a network interface controller (NIC) 124 may be configured to connect the computing device 100 through the bus 110 to a network 126. The network 126 may be a wide region network (WAN), local region network (LAN), or the Internet, among others.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

In examples, the non-volatile memory may be mapped for direct load-store access by the CPU. In a load-store architecture, the CPU may access a memory address of the non-volatile memory via load and store operations. Values for an operation can be loaded from the non-volatile memory and placed in the cache. Following the operation, the result is to be stored back to the non-volatile memory. In the load-store model, CPU performance can largely on the speed at which data is transferred between the cache and non-volatile memory. Most CPU caches are designed to function with pressure-eviction as the primary method of writing modified data to memory. Thus, there is little control of the precise moment when modification to non-volatile stored data (i.e. persistence) occurs. However, data integrity concerns, such as database and file system Atomicity, Consistency, Isolation, Durability (ACID) requirements depend upon some measure of control of write commitment timing. By pre-flushing the cache, the modification of the non-volatile store data can be performed quick enough to meet the database and file system ACID requirements.

Figure 2A:
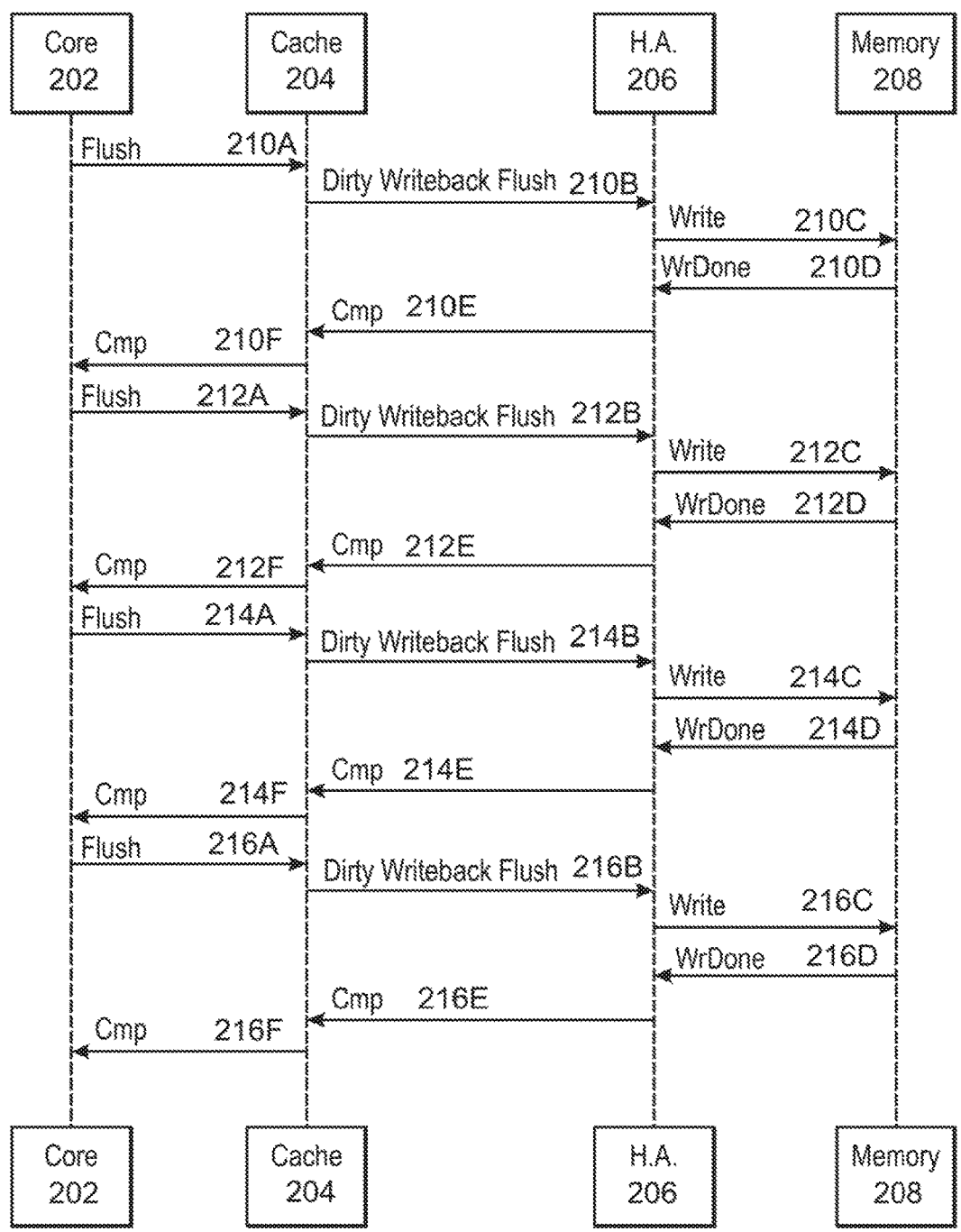
FIG. 2A is a diagram of a system with data transfers in a load-store model as described herein.

FIG. 2A is a diagram of a system 200A with data transfers in a load-store model as described herein. The system 200A includes a core 202, a cache 204, a home agent (HA) 206, and a memory 208. The core 202 may be a processing unit, such as the CPU 102 (FIG. 1) described above. Similarly, the cache may be the cache 106 (FIG. 1) described above. The home agent 206 is to control access to the memory 208. In some embodiments, the home agent 206 is a memory controller 114 (FIG. 1) as described above. Moreover, the memory 208 may be a non-volatile memory 108 (FIG. 1) as described above.

Under normal operations, the core 202 issues a flush 210A to the cache 204. In response to the flush 210A from the core 202, the cache 204 proceeds to execute the flush by issuing a dirty write back flush 210B to the home agent 206. The home agent 206 then writes the data to the memory 208 with a write 210C. Upon completion of the write 210C, the memory 208 issues a write done 210D to the home agent 206 to indicate that the write is complete. Subsequently, the home agent issues a complete 210E to the cache 204. The cache 204 then issues a complete 210F to the core 202. A flush 212A is sent to the cache 204 upon receipt of the complete 210F, which indicates that the flush 210A instruction has completed. Thus, the flush 212A waits for completion 210F of the flush 210A. Likewise, the flush 214A waits for the completion 212F of the flush 212A, and the flush 216A waits for the completion 214E of the flush 214A. Each of the flush 210A, 212A, 214A, and 216A are illustrated as ordered and occurring one at a time for ease of description. However, the flushes may be performed in parallel. The number of flushes performed in parallel may be determined according to the capabilities of the core 202.

As illustrated, the time that it takes to complete each of the flush 210A, 212A, 214A, and 216A are dependent in part upon a dirty write back flush 210B, 212B, 214B, and 216B. A dirty area of the cache is one that has been updated by the CPU. The dirty area of the cache is incoherent with the corresponding data address in memory. A dirty write back occurs to update the corresponding data address with data from the cache, thus creating a coherent region of the cache. The core 202 issues flush instructions that walks through an area of memory, region by region, in order to create cache coherency. Writes to non-volatile memory, such as each write 210C, 212C, 214C, and 216C can consume a large amount. The write latency of non-volatile memory is several orders of magnitude higher than that of volatile memory. In a load-store architecture, the write latency that occurs with dirty write backs can cause the system to fail to meet database ACID requirements. The ACID requirements are a set of properties that guarantee that database transactions are processed reliably.

Dirty write backs are a normal part of volatile memory operations. Moreover, snoops are a normal part of volatile memory operations. Processors typically support high snoop rates along with many concurrent snoops and many concurrent resulting dirty write backs. In some embodiments, a snoop is a speculative technique where cache activity is monitored in order to locate any activity that may cause regions of the cache to become invalid according to a cache protocol. The snoops can be applied to a cache flushing to non-volatile memory, and a pre-flush can be performed based on the snoop.

Figure 2B:
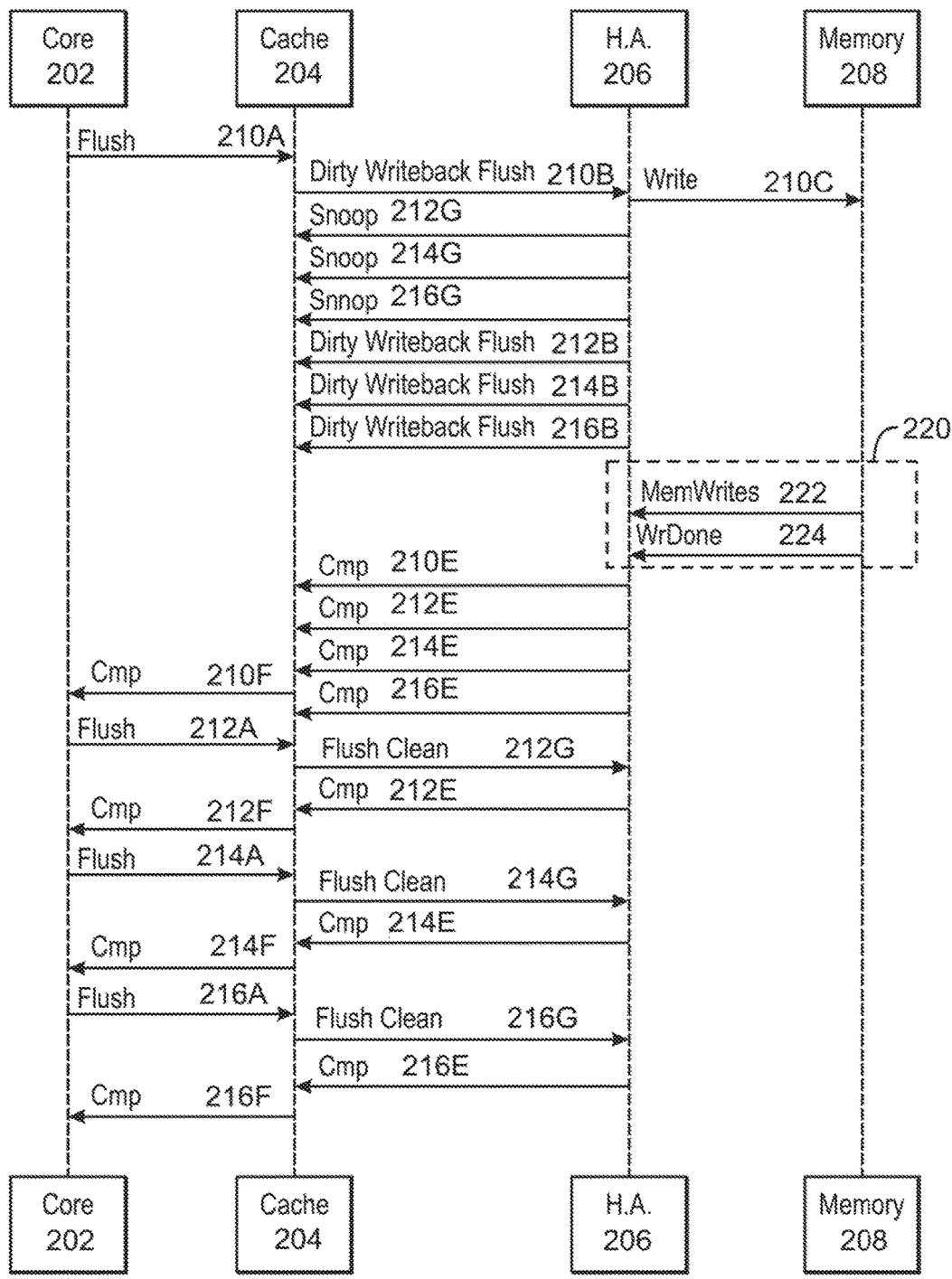
FIG. 2B is a diagram of a system with data transfers with a hardware cache assist in a load-store model as described herein.

FIG. 2B is a diagram of a system 200B with data transfers with a hardware flush assist in a load-store model as described herein. The system 200B is similar to FIG. 2A, and includes a core 202, a cache 204, a home agent (HA) 206, and a memory 208 as described above. The home agent 206 monitors the cache for activity that can cause incoherent regions. When the core 202 issues the flush 210A, the home agent 206 may also issue one or more snoops. As illustrated, the home agent 206 issues snoop 212G, snoop 214G, and snoop 216G. Each snoop is directed to a region of memory offset from the address of the flush 210A. In some embodiments, the snoop is offset from the address of the flush 210A such that if the core is sequentially stepping though an area of memory, region by region, where all regions are clean, it traverses the address from the flush 210A to the offset in the time it takes for a dirty flush to complete. While the snoop 212C, snoop 214G, and snoop 216G are illustrated separately, the snoops may occur in parallel or at the same time.

Accordingly, while the dirty write back flush 210B and write 210C are executed, the snoops 212G, 214G, and 216G cause a series of speculative memory writes. Reference number 220 illustrates data transfers as a result of the snoops 212G, 214G, and 216G. The dirty write back flush 212B, 214B, and 216B each occur as a result of their respective snoop. A set of memory writes 222 is to pre-flush the regions of memory that would be subsequently flushed by the flush 212A, flush 214A, and flush 216A. The memory writes 222 includes the writes 212C, 214C, and 216C. The series of memory writes 222 results in a series of write dones 224. The write dones 224 includes each write done 210D, 212D, 214D, and 216D. Since the write done 210C has issued, the home agent issues a complete 210E to the cache 204. The cache 204 then issues a complete 210F to the core 202.

A flush 212A is sent to the cache 204 upon receipt of the complete 210F, which indicates that the flush 210A instruction has completed. However, the area of the cache to be flushed according to the core 202 instruction has been previously flushed via the snoop 212G, memory writes 222, and write dones 224. A flush clean 212E instruction is sent to the home agent 206, which can immediately return the complete 212E since a series of write dones 224 has previously indicated that the instructed write to memory 208 is complete. In this manner, each flush instruction from the CPU encounters a pre-flushed region of memory that is clean. No write to non-volatile memory is performed, and the cache is made coherent in less time, without non-volatile memory latency being associated with each flush instruction on a dirty region of the cache. Note that FIG. 2B illustrates a single flush instructions for ease of description. As noted above, several flush instructions may be performed in parallel.

Figure 3:
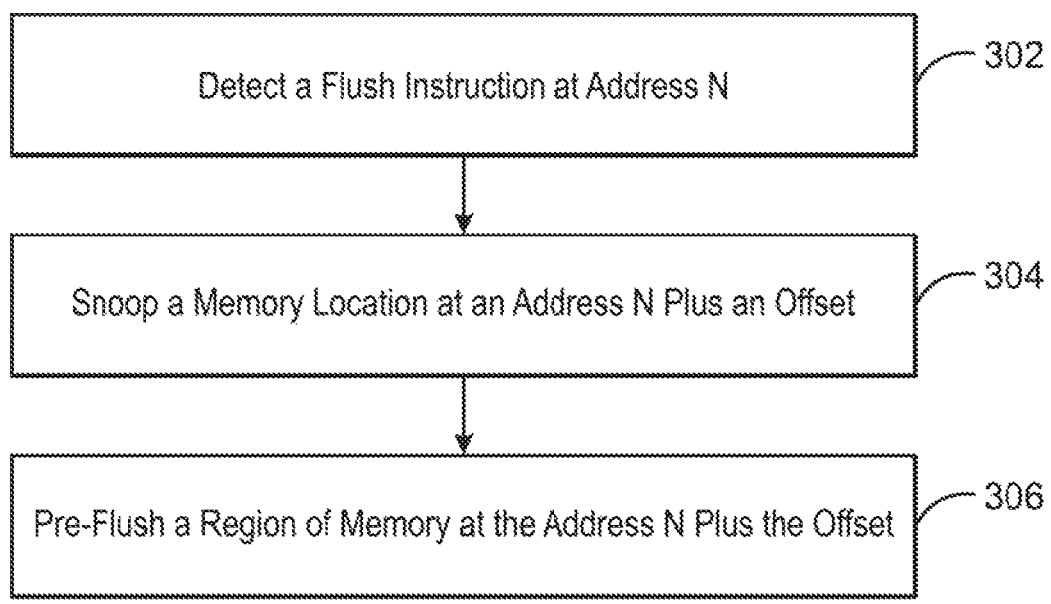
FIG. 3 is a process flow diagram of a method for a hardware flush assist.

FIG. 3 is a process flow diagram of a method 300 for a hardware flush assist. At block 302, a flush instruction is detected a flush instruction at address N. Flush instructions result in activity visible to the home agent, as the home agent is responsible for issuing snoops to other caches in other parts of the system. Accordingly, the flush activity is a trigger for snoops according to the present techniques. In some embodiments, a hardware engine is located in the memory controller, which is also the home agent for the memory region. The hardware engine takes advantage of the high-performance, highly concurrent snoop capabilities, to assist software flush loops, by "pre-flushing" ahead of the software using snoop flows. When the home agent receives a flush for address N (the instruction may cause a write if dirty or an invalidate if clean), it performs the flush as normal. This flush is blocking, where the underlying flush instruction blocks until persistence is achieved.

At block 304, a memory location at the address N plus an offset is snooped. When the home agent receives a flush for address N, it also snoops the cache line at another address N+OFFSET, and writes any resulting dirty data to non-volatile memory. This snoop/write back is non-blocking. It is speculative, designed to pre-clean or pre-flush the memory ahead of the future stream of software-initiated Clean or flush instructions. If the software is sequentially flushing a region of memory, by the time it reaches and attempts to flush address NA-OFFSET, it is most likely to encounter an already-clean cache line, because the prior speculative snoop has was issued earlier when cache line N was flushed. Thus, for sequential flushes or cleans of large areas, software flush loops encounter mostly already-clean cache lines. Clean cache line flushes proceed faster than dirty ones, because they do not have to wait for the non-volatile memory device write latency.

The value of OFFSET is chosen such that, when a software flush loop is progressing sequentially through a memory region for which all cache lines are already clean, it will traverse the range from address N to address NA-OFFSET in approximately the amount of time that it takes for a dirty flush to complete to non-volatile memory. This allows the speculative snoops to pre-flush memory just far enough ahead of the software loop that cache lines are seldom ever hit by flush instructions while still dirty.

At block 306, a region of memory at the address N plus the offset is pre-flushed. The primary mechanism by which this invention speeds a flush operation, then, is by allowing the software to see mostly low-latency fast flushing clean cache lines, while the home-agent hardware behind the scenes is pre-flushing dirty cache lines before the software flush loop ever reaches them.

In this manner, the techniques described herein reduce the time associated with cache flushes, without affecting the native flush instructions. The hardware techniques disclosed assists with the performance of software that is coded using only the native flush instructions. In this manner, there is no disruptive recoding of software necessary. Moreover, this approach also works with native flush instructions that have been specifically tailored for load-store mapped non-volatile memory.

While the present techniques may be susceptible to various modifications and alternative forms, the embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

What is claimed is:

1. A system for a hardware flush assist, comprising:
   a cache;
   a memory;
   a home agent, wherein the home agent is to detect a flush instruction on the cache at an address; and
   a memory controller, wherein the memory controller comprises a hardware engine, and the hardware engine is to snoop a region of the cache at an offset of the address, and write the region to the memory at the offset of the address, wherein the offset is a value such that a traversal time across a clean region of the cache from the address to the offset plus the address is less than an amount of time that a dirty flush is completed at the non-volatile memory.

2. The system of claim 1, wherein the memory controller is the home agent.

3. The system of claim 1, wherein the home agent is to detect a plurality of flush instructions on the cache at a plurality of addresses, and the hardware engine is to snoop a region of the cache at an offset of each of the plurality of addresses, and write the region to the memory at the offset of each of the plurality of addresses.

4. The system of claim 1, wherein the snoop is speculative.

5. A method for a hardware flush assist, comprising:
   detecting a flush instruction at address N;
   snooping a memory location at the address N plus a selected offset; and pre-flushing a region of memory at the address N plus the offset, wherein the offset is selected such that a traversal time across a clean region of the cache from the address to the offset plus the address is less than an amount of time that a dirty flush is completed at the non-volatile memory.

6. The method of claim 5, wherein pre-flushing the region of memory is performed prior to a next flush instruction directed the address plus the offset.

7. The method of claim 5, wherein the snooping is concurrent with the flush instruction.

8. An apparatus for a hardware flush assist, comprising:
   a processing element, wherein the processing element is to:
   detect a flush instruction on a cache at an address;
   snoop a region of the cache at an offset of the address; and
   write the region to the memory at the offset of the address, wherein the offset is a value such that a traversal time across a clean region of the cache from the address to the offset plus the address is less than an amount of time that a dirty flush is completed at the non-volatile memory.

9. The apparatus of claim 8, wherein the offset address is to be calculated as an offset of an address N received for a flush.

10. The apparatus of claim 8, wherein the processing element includes a hardware engine.

11. The apparatus of claim 8, wherein flush instructions are monitored by the processing element.

12. The apparatus of claim 8, wherein the snoop and write is non-blocking.

\* \* \* \* \*